United States Patent
Gaal et al.

(10) Patent No.: US 9,226,290 B2
(45) Date of Patent: Dec. 29, 2015

(54) MULTIPLE TIMING ADVANCE GROUPS (TAGS) FOR UL CARRIER AGGREGATION (CA)

(71) Applicant: QUALCOMM Incorporated, San Diego, CA (US)

(72) Inventors: Peter Gaal, San Diego, CA (US); Jelena Damnjanovic, Del Mar, CA (US); Valentin Alexandru Gheorghiu, Tokyo (JP); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/802,178

(22) Filed: Mar. 13, 2013

(65) Prior Publication Data

US 2014/0050194 A1 Feb. 20, 2014

Related U.S. Application Data

(60) Provisional application No. 61/684,125, filed on Aug. 16, 2012.

(51) Int. Cl.
*H04J 3/00* (2006.01)
*H04W 72/04* (2009.01)
*H04W 56/00* (2009.01)

(52) U.S. Cl.
CPC ...... *H04W 72/0446* (2013.01); *H04W 56/0005* (2013.01); *H04W 56/0045* (2013.01); *H04W 72/0453* (2013.01)

(58) Field of Classification Search
None
See application file for complete search history.

(56) References Cited

U.S. PATENT DOCUMENTS

| 2012/0008600 | A1 | 1/2012 | Marinier et al. |
| 2012/0120821 | A1 | 5/2012 | Kazmi et al. |
| 2012/0250520 | A1 | 10/2012 | Chen et al. |
| 2012/0257601 | A1* | 10/2012 | Kim et al. ............... 370/336 |
| 2012/0282969 | A1 | 11/2012 | Jiang et al. |

(Continued)

FOREIGN PATENT DOCUMENTS

| WO | 2011085200 A1 | 7/2011 |
| WO | 2012112952 A1 | 8/2012 |

(Continued)

OTHER PUBLICATIONS

Catt: "Consideration on Multi-TA Capability," 3GPP Draft; R2-121140, 3rd Generation Partnership Project (3GPP), Mobile Competence Centre; 650, Route Des Lucioles ; F-06921 Sophia-Antipolis Cedex, France, vol. RAN WG2, no. jeju, Korea; 20120326-20120330, Mar. 20, 2012, XP050606160.

(Continued)

*Primary Examiner* — Jutai Kao
(74) *Attorney, Agent, or Firm* — Novak Druce Connolly Bove + Quigg LLP

(57) ABSTRACT

Techniques are provided for assigning aggregated component carriers. For example, a method may include receiving from a user equipment (UE) a set of rules associated with timing advance groups (TAGs) comprising allowable combinations of frequency bands. The method may include determining frequencies of aggregated component carriers. The method may include assigning the aggregated component carriers to at least one timing advance group based on the allowable combinations of frequency bands and the determined frequencies of the aggregated component carriers.

23 Claims, 12 Drawing Sheets

(56) References Cited

U.S. PATENT DOCUMENTS

| | | | |
|---|---|---|---|
| 2013/0343345 A1* | 12/2013 | Dinan | 370/332 |
| 2014/0119313 A1* | 5/2014 | Yang et al. | 370/329 |
| 2015/0085839 A1* | 3/2015 | Bergstrom et al. | 370/336 |

FOREIGN PATENT DOCUMENTS

| | | |
|---|---|---|
| WO | 2013112773 A1 | 8/2013 |
| WO | 2013112952 A1 | 8/2013 |

OTHER PUBLICATIONS

International Search Report and Written Opinion—PCT/US2013/055470—ISAEPO—Nov. 6, 2013.

Pantech: "Considerations on Multiple TA capability", 3GPP Draft; R2-122908 M-TA Capability(V2.1), 3rd Generation Partnership Project (3GPP), Mobile Competence Centre ; 650, Route Deslucioles; F-06921 Sophia-Antipolis Cedex; France, val. RAN WG2, no.Prague, Czech; 20120521-20120525, May 15, 2012, XP050607460, pp. 3.

\* cited by examiner

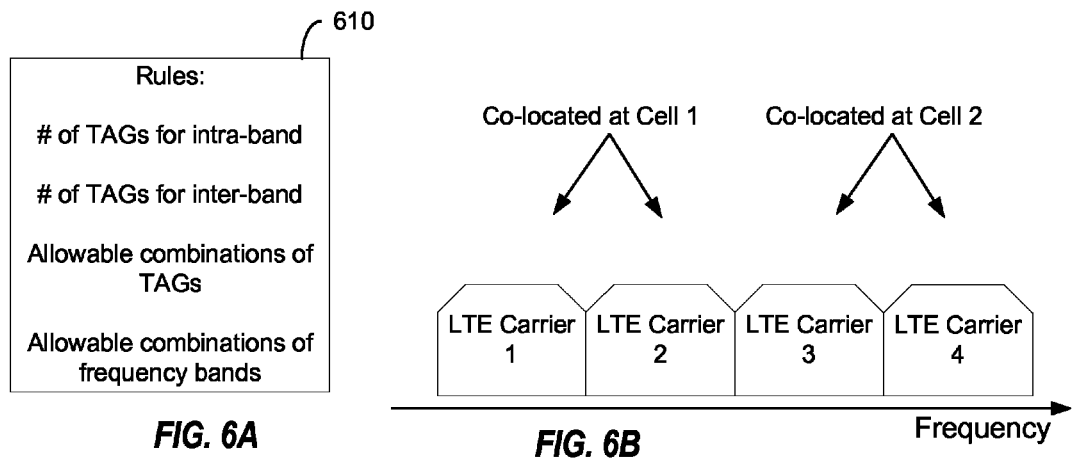
FIG. 6A
FIG. 6B
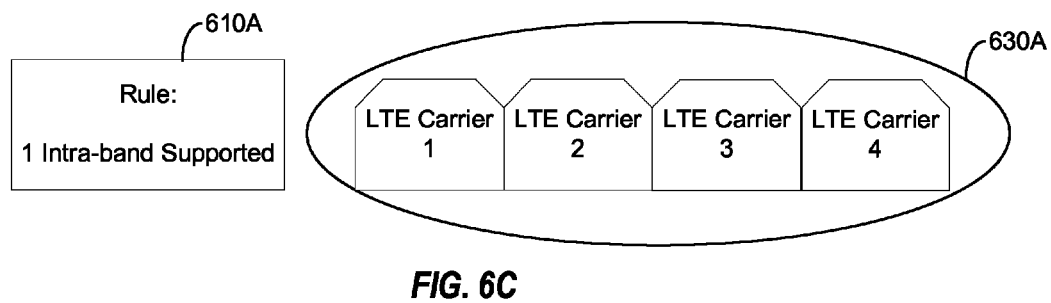
FIG. 6C
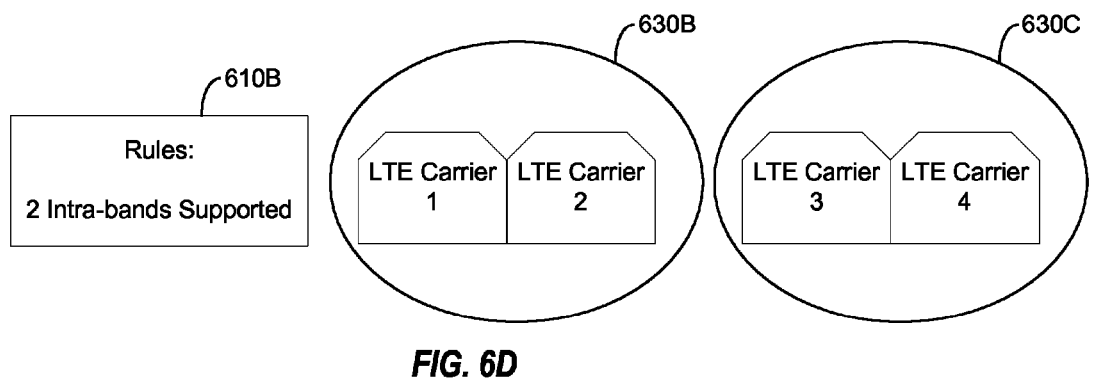
FIG. 6D

MULTIPLE TIMING ADVANCE GROUPS (TAGS) FOR UL CARRIER AGGREGATION (CA)

CROSS-REFERENCE TO RELATED APPLICATION

The present Application for Patent claims priority to Provisional Application No. 61/684,125, filed Aug. 16, 2012, entitled "MULTIPLE TIMING ADVANCE GROUPS (TAGS) FOR UL CARRIER AGGREGATION (CA)", which is assigned to the assignee hereof, and is hereby expressly incorporated in its entirety by reference herein.

BACKGROUND

1. Field

Aspects of the present disclosure relate to wireless communication systems and to timing advance grouping for UL carrier aggregation.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. As used herein, a "carrier" refers to a radio band centered on a defined frequency and used for wireless communications.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

To establish initial connection with an eNB, a UE may measure the downlink (or forward link) signals to determine the downlink synchronization. The UE may then send out a random access channel (RACH) preamble in the uplink (or reverse link) direction. Once the eNB receives the RACH preamble, the eNB may estimate a timing difference and send the UE timing advance (TA) information in a random access response (RAR) message. The timing advance may compensate for the propagation delay between the eNB and the UE. The timing advance may vary based on time, due to mobility of the UE. In a TA maintenance phase, the eNB may measure the timing of the received UL data and just the UL timing using the TA command.

LTE UEs may use bandwidth allocated in a carrier aggregation (up to 5 component carriers) for transmission in each direction. Generally, less traffic is transmitted on the uplink than the downlink, so the uplink spectrum allocation may be smaller than the downlink allocation. Component carriers may share a same timing advance value and belong to the same timing advance group (TAG). Another set of component carriers may have a different TAG.

SUMMARY

Methods and apparatus for assigning aggregated component carriers to timing advance groups are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method includes receiving from a user equipment (UE) a set of rules associated with timing advance groups (TAGs) including allowable combinations of frequency bands. The method includes determining frequencies of aggregated component carriers. The method includes assigning the aggregated component carriers to at least one timing advance group based on the allowable combinations of frequency bands and the determined frequencies of the aggregated component carriers.

In another aspect, a wireless network entity includes means for receiving from a user equipment (UE) a set of rules associated with timing advance groups (TAGs) including allowable combinations of frequency bands. The wireless network entity includes means for determining frequencies of aggregated component carriers. The wireless network entity includes mean for assigning the aggregated component carriers to at least one timing advance group based on the allowable combinations of frequency bands and the determined frequencies of the aggregated component carriers.

In another aspect, a wireless network entity includes at least one processor configured to: receive from a user equipment (UE) a set of rules associated with timing advance groups (TAGs) including allowable combinations of frequency bands, determine frequencies of aggregated component carriers, and assign the aggregated component carriers to at least one timing advance group of aggregated component carriers based on the allowable combinations of frequency bands and the determined frequencies of the aggregated component carriers. The wireless network entity includes a memory coupled to the at least one processor for storing data.

In another aspect, a computer program product includes a computer-readable medium including code for causing at least one computer to receive from a user equipment (UE) a set of rules associated with timing advance groups (TAGs) including allowable combinations of frequency bands. The computer-readable medium includes code for causing the at least one computer to determine frequencies of aggregated component carriers. The computer-readable medium includes code for causing the at least one computer to assign the aggregated component carriers to at least one timing advance group of aggregated component carriers based on the allowable combinations of frequency bands and the determined frequencies of the aggregated component carriers.

In another aspect, a method includes determining a set of rules associated with timing advance groups. The method includes sending the set of rules associated with timing advance groups to a base station. The method includes receiving an indication of an assignment of aggregated component carriers to at least one timing advance group (TAG), wherein the assignment to the at least one timing advance group corresponds to the set of rules.

In another aspect, a user equipment includes means for determining a set of rules associated with timing advance groups. The user equipment includes means for sending the set of rules associated with timing advance groups to a base station. The user equipment includes means for receiving an indication of an assignment of aggregated component carriers to at least one timing advance group (TAG), wherein the assignment to the at least one timing advance group corresponds to the set of rules.

In another aspect, a user equipment includes at least one processor configured to: determine a set of rules associated with timing advance groups, send the set of rules associated with timing advance groups to a base station, and receive an indication of an assignment of aggregated component carriers to at least one timing advance group (TAG), wherein the assignment to the at least one timing advance group corresponds to the set of rules. The Wi-Fi apparatus includes a memory coupled to the at least one processor for storing data.

In another aspect, a computer program product includes a computer-readable medium including code for causing at least one computer to determine a set of rules associated with timing advance groups. The computer-readable medium includes code for causing the at least one computer to send the set of rules associated with timing advance groups to a base station. The computer-readable medium includes code for causing the at least one computer to receive an indication of an assignment of aggregated component carriers to at least one timing advance group (TAG), wherein the assignment to the at least one timing advance group corresponds to the set of rules.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIGS. 6A-F illustrate assignment of aggregated component carriers to timing advance groups (TAGs) according to the various embodiments;

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
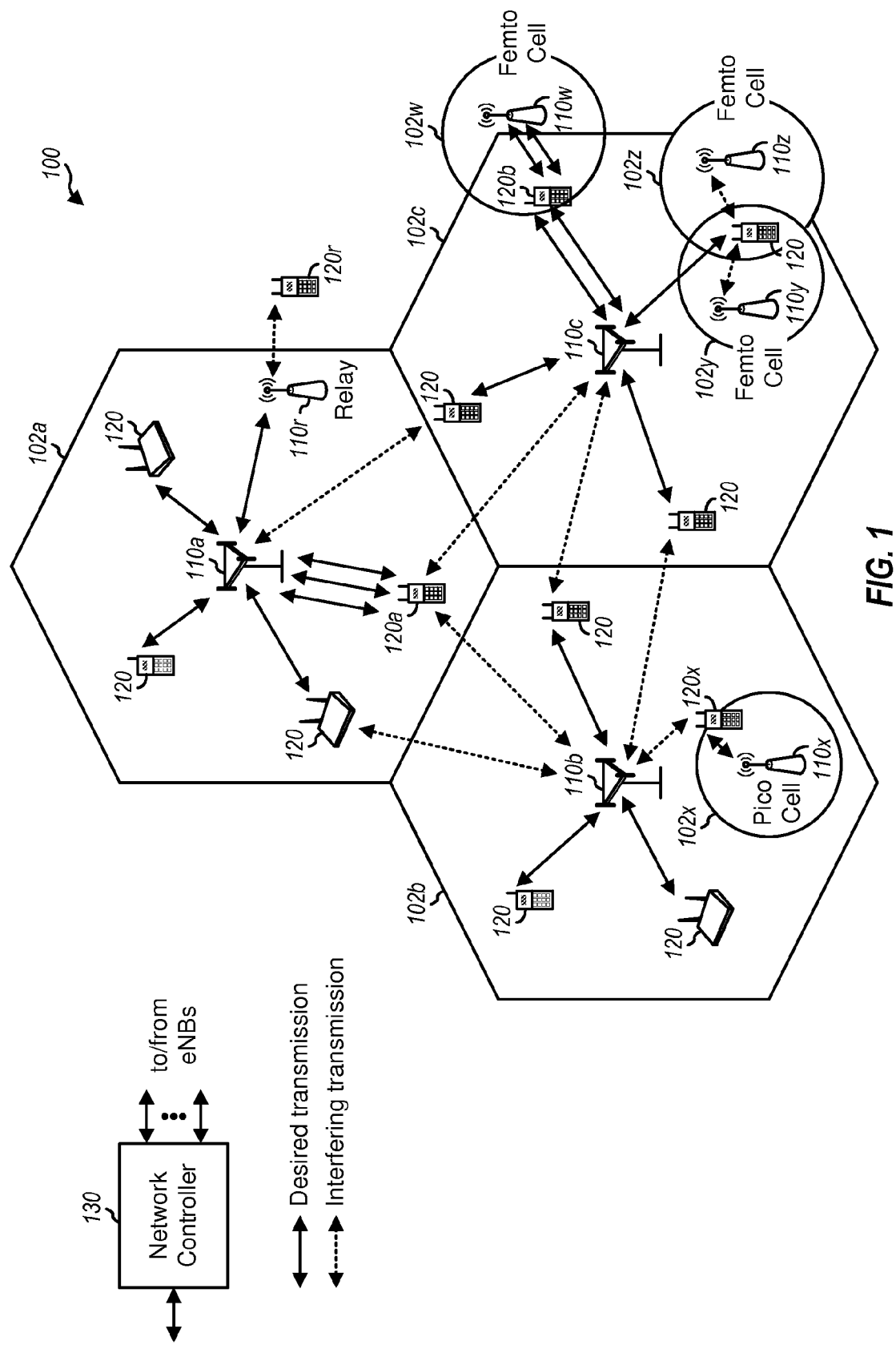
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110w, 110y, and 110z may be femto eNBs for the femto cells 102w, 102y, and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. The single solid line between the UE and serving eNB may indicate a communication link between the UE and serving eNB. Multiple solid lines may indicate the UE configured for carrier aggregation (CA). Carrier aggregation may be enabled for one base station in a collocated configuration. Carrier aggregation may be enabled for more than one base station in a non-collocated configuration.

LTE-Advanced UEs may use spectrum, in up to 20 MHz bandwidths, allocated in a carrier aggregation of up to a total of 100 MHz (5 component carriers) used for transmission in each direction. The three solid lines between UE 120a and base station 110a illustrate support for three component carriers, which may include a primary component carrier (PCC) and a secondary component carrier (SCC). Up to 5 component carriers, including the PCC and one or more secondary component carriers, may be supported between UE 120a and base station 110a. The communication links between UE 120a and base station 110a may illustrate collocated carrier aggregation. In non-collocated carrier aggregation, a UE 120b may be allocated component carriers of two or more base stations 110c, 110w at separate locations. UE 120 is shown with two component carriers from base station 110c and two component carriers from base station 110w. The PCC may carry control signaling. All component carriers, including the PCC may carry traffic data. Carrier aggregation may be configured for contiguous and non-contiguous CA. Carrier aggregation may be configured for intra-band and inter-band type CA. For example, the component carriers for UE 120a may be configured for contiguous intra-band carrier aggregation. The component carriers may belong to a timing advance group (TAG), which may compensate for propagation delay between the base station 110a and the UE 120a. For example, the three component carriers illustrated by the solid lines between UE 120a and base station 110a may belong to a same TAG. In another example, a first component carrier may belong to one TAG with a second component carrier, and the first component carrier may belong to another TAG with a third component carrier. It may be noted that a component carrier may belong to multiple TAGs.

The availability of multiple TAGs presents opportunities for improvements in communication between the UEs and eNBs. Grouping of the different component carriers may enable improved signal reception and efficiency. For example, due to multi-path effects, overlap in carrier subframe boundaries, and other phenomena in the RF environment, the received signal strength of the component carriers may vary significantly. This can lead to suboptimal receive processing and, in a worst case scenario, radio link failure. Accordingly, the present disclosure provides techniques for efficient and reliable communications based on assigning TAGS for aggregated component carriers.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.4, 3, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.4, 3, 5, 10 or 20 MHz, respectively.

Figure 2:
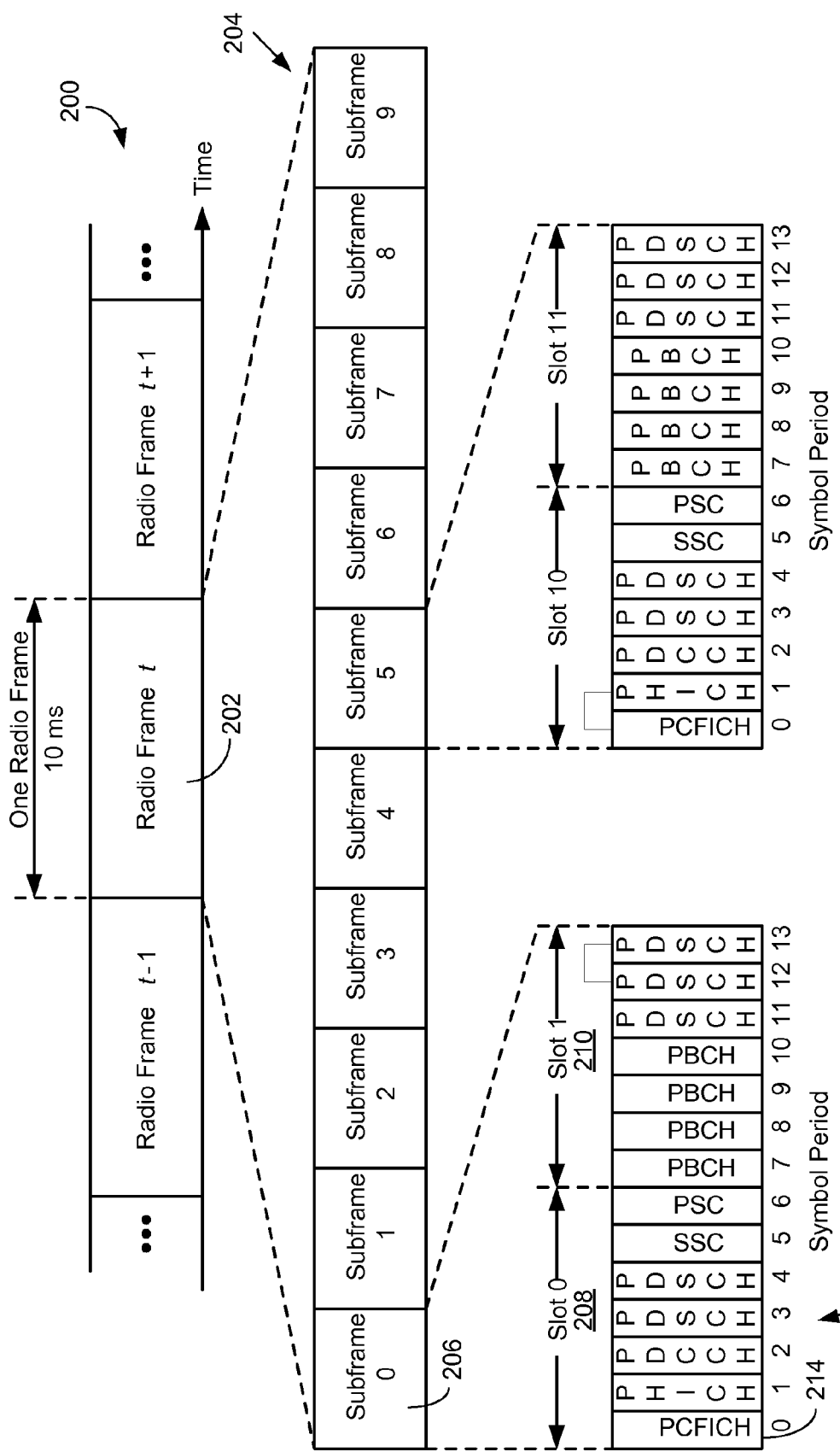
FIG. 2 is a block diagram conceptually illustrating an example of a down link frame structure in a telecommunications system.

FIG. 2 shows a down link frame structure used in LTE. The transmission timeline for the downlink may be partitioned into units of radio frames 200. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include 'L' symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover 'N' subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical H-ARQ Indicator Channel (PHICH) and a Physical Downlink Control Channel (PDCCH) in the first M symbol periods of each subframe (M=3 in FIG. 2). The PHICH may carry information to support hybrid automatic retransmission (H-ARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
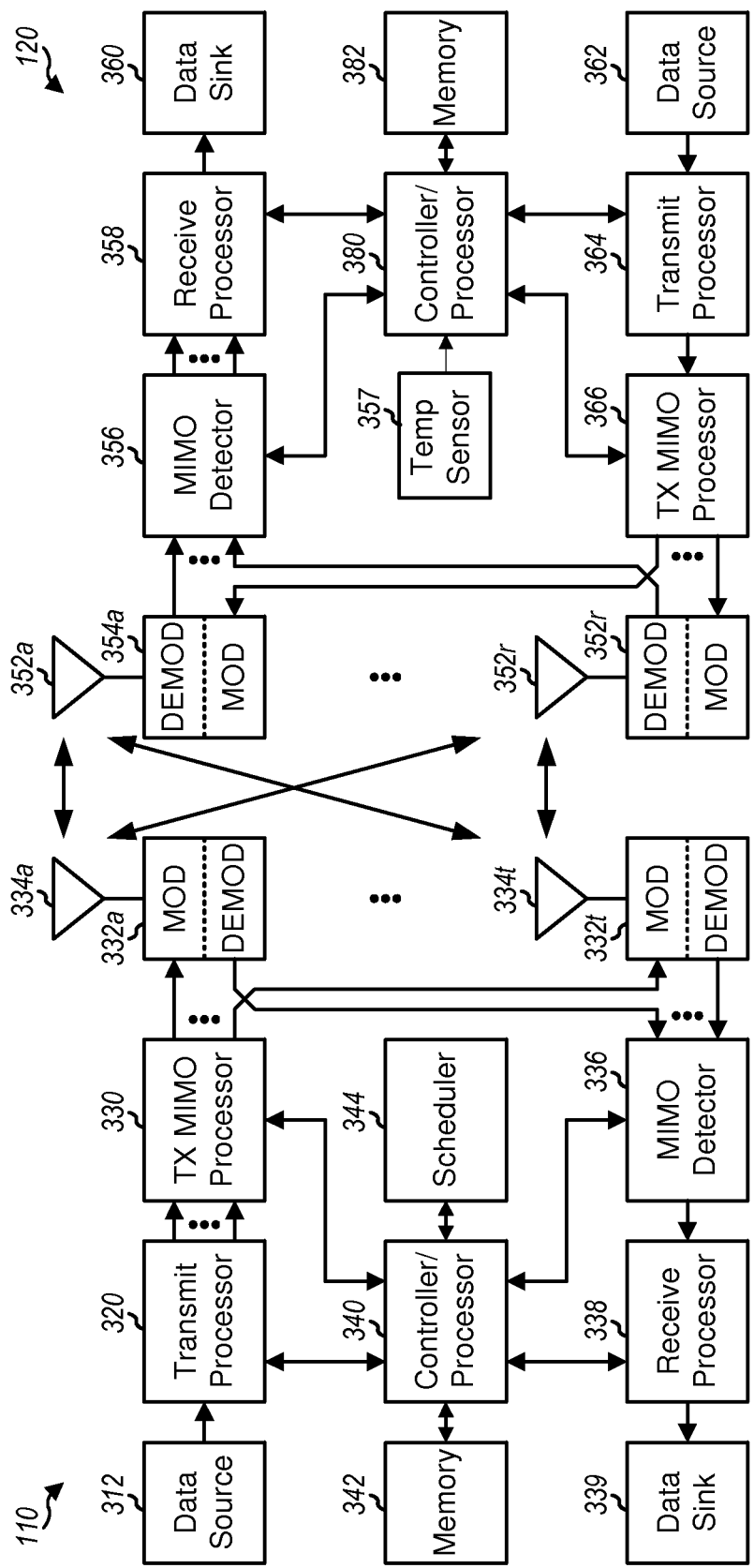
FIG. 3 is a block diagram conceptually illustrating is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. The processor 380 may include modules for performing operations of the methods described herein, by executing instructions held in the memory 382. Such modules may include, for example, modules for measuring data quality, sensing resource constraints, and providing control signals in a control channel for transmitting to the eNB 110. In an aspect, the UE 120 may include a temperature sensor 357 (e.g., a thermistor) coupled to the controller for sensing a temperature of one or more hardware components of the processor. Temperature or other resource measurement may be used as input to an algorithm for controlling transmission of data in carrier aggregation, as described in more detail elsewhere herein.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein, including the functional blocks illustrated in FIG. 8. The processor 380 and/or other processors and modules at the UE 120 may also perform or direct the execution of the functional blocks illustrated in FIG. 9, and/or other processes for the techniques described herein. The memories 342 and 382 may store data and program codes for the base station 110 and the UE 120, respectively. A scheduler 344 may schedule UEs for data transmission on the downlink and/or uplink. The UE may include one or more additional components as shown and described in connection with FIG. 11.

LTE-Advanced UEs use spectrum in 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

In LTE Rel-10, a UE may be configured with up to 5 component carriers (CC) for (CA). Each CC may use up to 20 MHz and maintain backward compatible. Up to 100 MHz may be configured for a UE. CCs in CA may be either all FDD or TDD. There is no mixture of FDD & TDD in CA. All TDD CCs may have the same DL:UL configuration, although special subframes may be configured separately for different CCs. One CC may be designated as the primary CC (PCC or PCell), which may be the only CC carrying PUCCH and common search space. Other CC(s) may be designated as the secondary CC(s) (SCC or SCell).

In LTE Rel-11, aggregation of TDD of different configurations may be supported, allowing more flexibility in deployment. Each CC may be backward compatible for Rel-8/9/10 in the single carrier mode, although it is also possible to introduce non-backward compatible CCs (e.g., carrier segments, extension carriers). In future releases, aggregation of TDD and FDD may be supported.

Figure 4A:
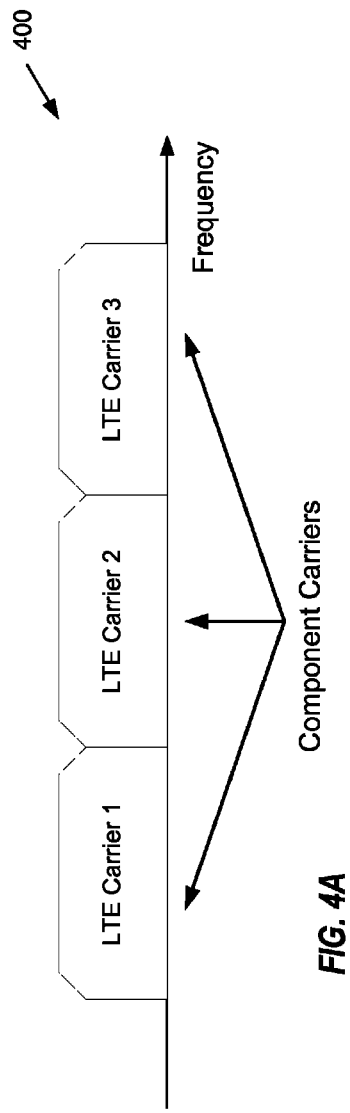
FIG. 4A discloses a contiguous carrier aggregation type.
Figure 4B:
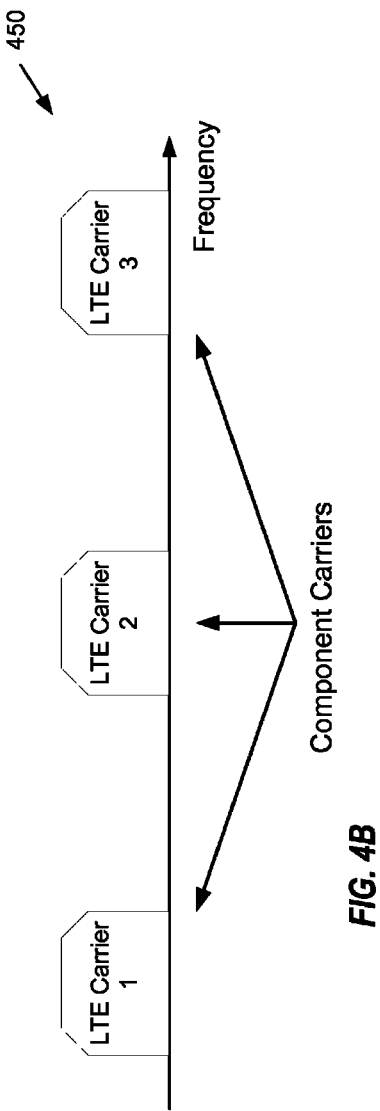
FIG. 4B discloses a non-contiguous carrier aggregation type.

For the LTE-Advanced mobile systems, two types of carrier aggregation (CA) methods have been proposed, contiguous CA and non-contiguous CA. They are illustrated in FIGS. 4A and 4B. Non-contiguous CA 450 refers to configurations wherein multiple available component carriers are separated along the frequency band (FIG. 4B). On the other hand, contiguous CA 400 refers to configurations wherein when multiple available component carriers are adjacent to each other (FIG. 4A). Both non-contiguous and contiguous CA aggregate multiple LTE/component carriers to serve a single unit of LTE Advanced UE.

Multiple RF receiving units and multiple FFTs may be deployed with non-contiguous CA in LTE-Advanced UE since the carriers are separated along the frequency band. Because non-contiguous CA supports data transmissions over multiple separated carriers across a large frequency range, propagation path loss, Doppler shift and other radio channel characteristics may vary a lot at different frequency bands.

Thus, to support broadband data transmission under the non-contiguous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Figure 5:
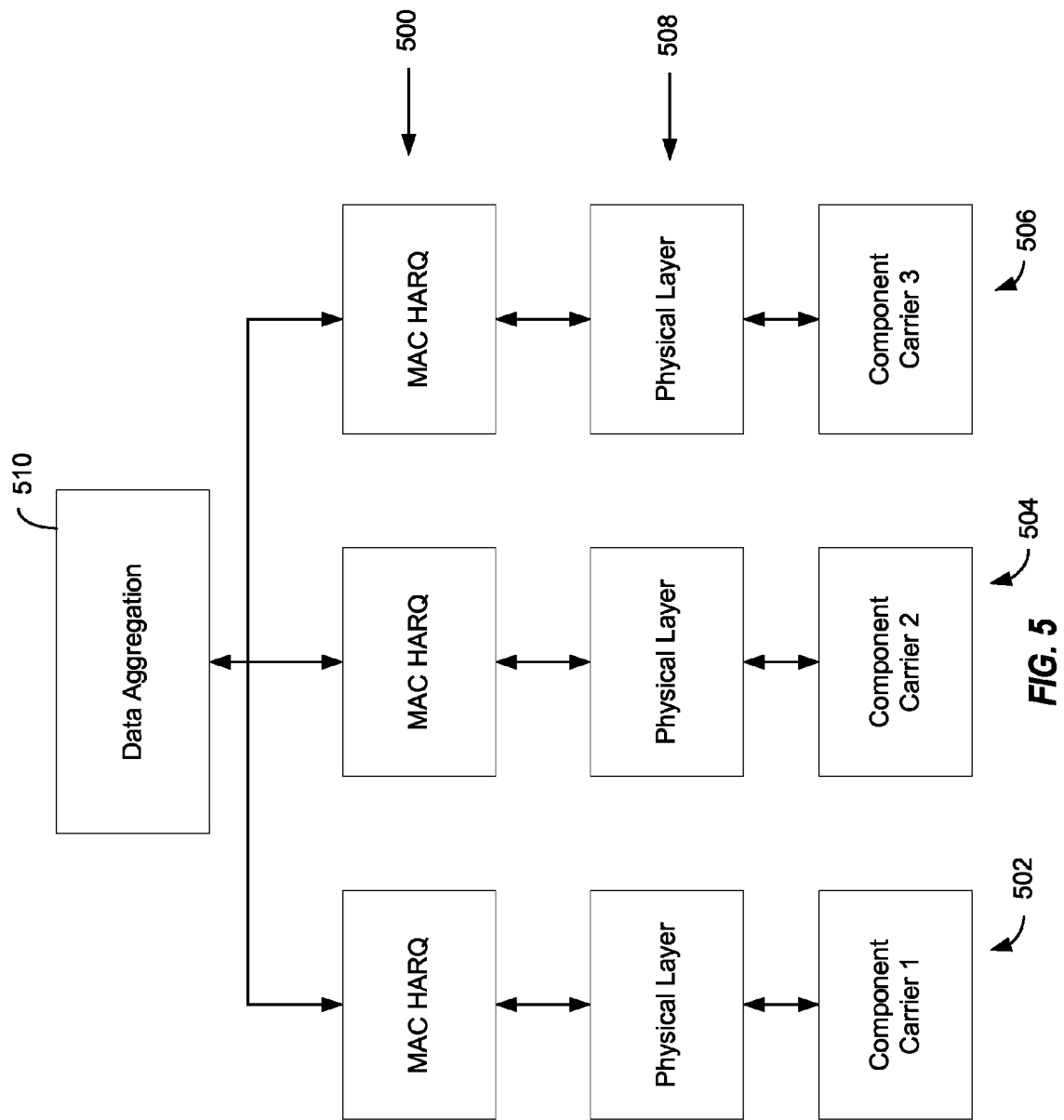
FIG. 5 discloses MAC layer data aggregation.

FIG. 5 illustrates aggregating transmission blocks (TBs) from different component carriers 502, 504, 506 at the medium access control (MAC) layer 500 for an International Mobile Telecommunications-Advanced (IMT-Advanced) system. With MAC layer data aggregation, each component carrier has its own independent hybrid automatic repeat request (H-ARQ) entity in the MAC layer 500 and its own transmission configuration parameters (e.g., transmitting power, modulation and coding schemes, and multiple antenna configuration) in the physical layer. Similarly, in the physical layer 508, one H-ARQ entity is provided for each component carrier. A data aggregation process 510 may be performed at the receiver to aggregate data from different component carriers into an aggregated data stream, when the data is directed to a single service or application.

In 3GPP Rel-11 up to 4 multiple TAGs may be defined, e.g., for a UE. Aggregated carriers may be grouped in any combination, with no limitations. Due to carrier interference, propagation delays of different carriers, etc., it may be advantageous to include carriers in one frequency band to a same TAG. A signaling (e.g., a report or message) sent from the UE indicating whether it supports multiple TAGs for intra-band CA or not may be beneficial. The signaling may also indicate whether the UE supports more than one TAG for inter-band CA, allowable combinations of TAGs, and/or allowable combinations of frequency bands.

From an implementation point of view it may be desirable to have all carriers in one band belonging to the same TAG. A signaling from the UE of whether the UE supports multiple TAGs for intra-band CA or not could be defined in case some implementations support different Fast Fourier Transform (FFTs) for intra-band aggregation (to address intra-band non-collocated CA). There may be power scaling when transmissions between different carriers of TAGs overlap due to the different timing, and there may be different degrees of overlap between carriers at subframe boundaries. When the UE reaches the power capacity, and there is a power change on each carrier, the UE may have to change the power on each channel up to four times in a 30 μs (microsecond) period. The design for an apparatus may increase in complexity if all possible combinations of TAG groupings are allowed when there are more than 2 TAGs. The UE may support more than one TAG for intra-band CA. The UE may support more than one TAG for inter-band CA. The UE may support any number of frequency band combinations in a TAG. For example, when more than 3 CCs are aggregated it may be desirable to allow for flexibility in grouping the CCs. For example, a UE may support CA of CC1, CC2, and CC3. When only CC1 and CC2 are aggregated, C1 and CC2 may belong to the same TAG or to different TAGs. When only CC1 and CC3 are aggregated, they may belong only to the same TAG—for example based on the rules from the UE or network preferences. When CC1, CC2, and CC3 are aggregated, CC1 and CC2 may not belong to the same TAG, but CC2 and CC3 may belong to the same TAG—for example based on the rules from the UE or network preferences.

Figure 6E:
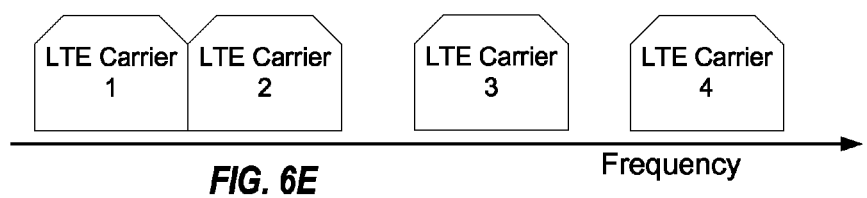

FIGS. 6A-F illustrate assignment of aggregated component carriers to TAGs according to the various embodiments. FIG. 6A shows rules 610 for supporting TAG groupings for a UE. The UE may determine a set of rules 610 governing grouping of CCs to TAGs and send the rules to the network. For example, the rules 610 may include a supported number of TAGs for grouping intra-band aggregated component carriers. For example, the UE may support any number of TAG groupings from one through four for intra-band aggregated component carriers. The possible number of combinations of TAGs may depend on the number of intra-band component carriers. It may be desirable to group all intra-band component carriers together in the same TAG. In some cases, such as non-collocated carrier aggregation, it may be desirable to group non-collocated component carriers in separate TAGs.

For example, the rules 610 may include a supported number of TAGs for grouping inter-band aggregated component carriers. For example, the UE may support any number of TAG groupings from one through four for inter-band aggregated component carriers. The possible number of combinations of TAGs may depend on the number of inter-band component carriers.

The rules 610 may include allowable combinations of TAGs; the rules may include allowable combinations of frequency bands. The rules 610 for allowable combinations may define an exclusion, inclusion, etc. for frequency bands.

After the UE sends the rules to the network (e.g., to a base station), the network (e.g., at a base station) may assign CCs to TAGs based on the rules and/or network preferences. The network may assign CCs to an existing TAG or to a newly created TAG.

FIG. 6B illustrates an example configuration of four component carriers. LTE carriers 1, 2, 3, and 4 are intra-band component carriers. LTE carriers 1 and 2 are collocated at a first cell, e.g., of a first base station. LTE carriers 3 and 4 are collocated at a second cell, e.g., of a second base station. LTE carriers 1 and 2 are not collocated with LTE carriers 3 and 4. Certain UEs may support different processing, e.g., different FFTs, for non-collocated component carriers.

FIG. 6C illustrates an example set of rules 610A for a UE. The UE may be configured to support a single intra-band TAG. The UE may communicate this rule 610A, along with other rules (e.g., rules 610) to a base station. Based on the component carrier configuration of FIG. 6B and the rules 610A signaled by the UE, a base station may determine an assignment of the component carriers to TAGs. In the example of FIG. 6C, the UE supports only one intra-band TAG, and therefore the base station may group all the component carriers into a single TAG 630A. The base station may signal the TAG 630A assignment to the UE.

FIG. 6D illustrates another example set of rules 610B for a UE. The UE may be configured to support two intra-band TAGs. The UE may communicate this rule 610B, along with other rules (e.g., rules 610) to a base station. Based on the component carrier configuration of FIG. 6B and the rules 610B signaled by the UE, the base station may determine an assignment of the component carriers to TAGs. The base station may further determine the component carriers are non-collocated. In the example of FIG. 6D, the base station may assign non-collocated intra-band component carriers to different TAGs 630B, 630C. The base station may assign LTE carrier 1 and 2 of the first cell to one TAG 630B, and LTE carrier 3 and 4 of the second cell to another TAG 630C. The base station may signal the TAG 630B, 630C assignments to the UE.

FIG. 6E illustrates another example configuration of four component carriers. LTE carriers 1 and 2 are intra-band component carriers. The combination of LTE carriers 1 and 2 is inter-band with respect to LTE carriers 3 and 4.

Figure 6F:
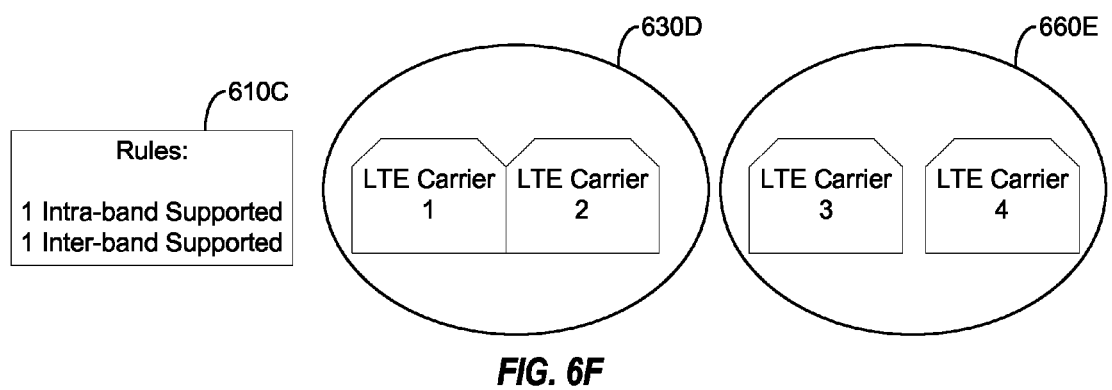

FIG. 6F illustrates another example set of rules 610C for a UE. The UE may be configured to support a single intra-band TAG and a single inter-band TAG. The UE may communicate these rules 610C, along with other rules (e.g., rules 610) to a base station. Based on the component carrier configuration of FIG. 6E and the rules 610D signaled by the UE, the base station may determine an assignment of the component carriers to TAGs. In the example of FIG. 6F, the UE supports only one intra-band TAG, and therefore the base station may group all the intra-band component carriers LTE carriers 1 and 2 into a single TAG 630D. The base station may group all the inter-band component carriers LTE carriers 3 and 4 into a single TAG 630E. The base station may signal the TAG 630D, 630E assignments to the UE.

Figure 7:
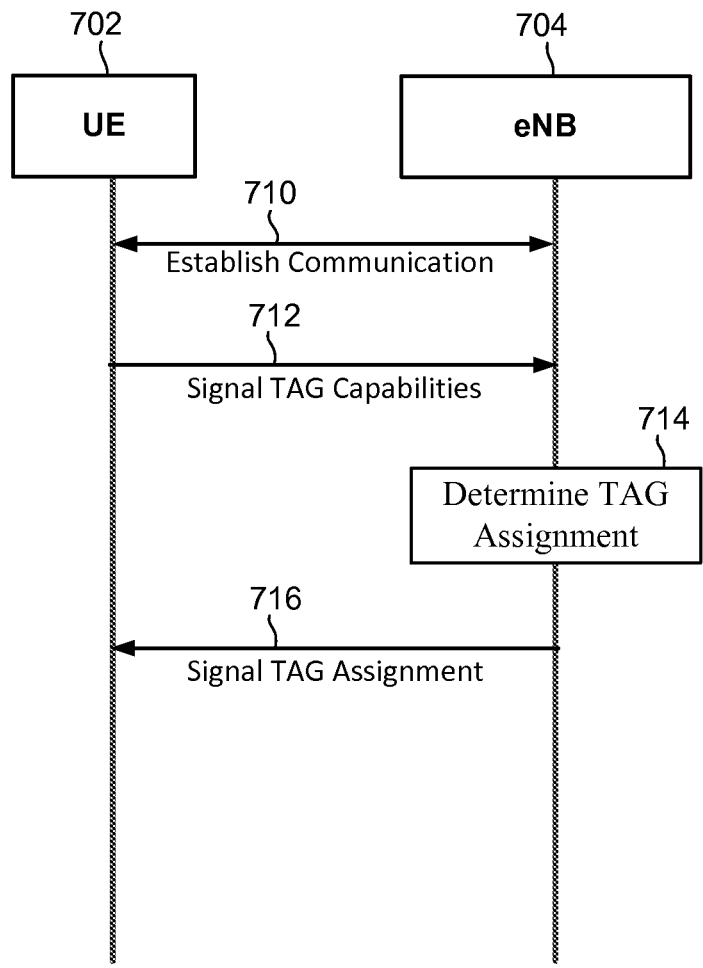
FIG. 7 illustrates an example call diagram of a system including a UE supporting signaling TAG capabilities.

FIG. 7 illustrates an example call diagram of a system including a UE signaling TAG capabilities. For example, UE 702 may be any UE 120 of FIG. 1 or 3. eNB 704 may be any base station 110 of FIG. 1 or 3. The UE 702 may establishment communication with the eNB 704 at step 710. The UE 702 may signal TAG capabilities to the eNB 704 at step 712. While the step is shown following the establishing the communication step 710, signaling the UE 702 TAG capabilities may be included or a part of the establishing communication step 710. The UE 702 may signal the capabilities based on an existing protocol or based on new signaling procedures. In one aspect, signaling the UE 702 TAG capabilities may include sending an indication of whether the UE supports multiple TAGs. The UE 702 may signal any or all of rules 610. In case the UE 702 does not support multiple TAGs, the UE 702 may indicate the lack of support for multiple TAGs in the signaling 712. In another aspect, the eNB 704 may assume the UE 702 does not support multiple TAGs based on no message or indication transmitted relating to the multiple TAGs. Based on the capabilities of the UE 702, the eNB 704 may determine TAG assignments for the UE 702 at step 714. The eNB 704 may signal the TAG assignments to the UE 702. Additionally or alternatively, the eNB 704 may signal TAG values to the UE 702 along with or separate from the TAG assignments.

In an example, the UE 702 and eNB 704 establish communication at step 710. The UE 702 may be capable of supporting multiple TAGs. At step 712, the UE 702 signals its ability to support multiple TAGs to the eNB 704. In this example, three intra-band component carriers, one PCC and two SCCs, are established between the UE 702 and the eNB 704. The eNB 704 may determine TAG assignments for the component carriers based on the TAG capabilities signaled by the UE

702. The eNB 704 may determine to group all intra-band component carriers in a same TAG. In this example, the eNB 704 assigns all three intra-band component carriers to one TAG. The eNB 704 signals the assignment to the UE at step 716.

Figure 8:
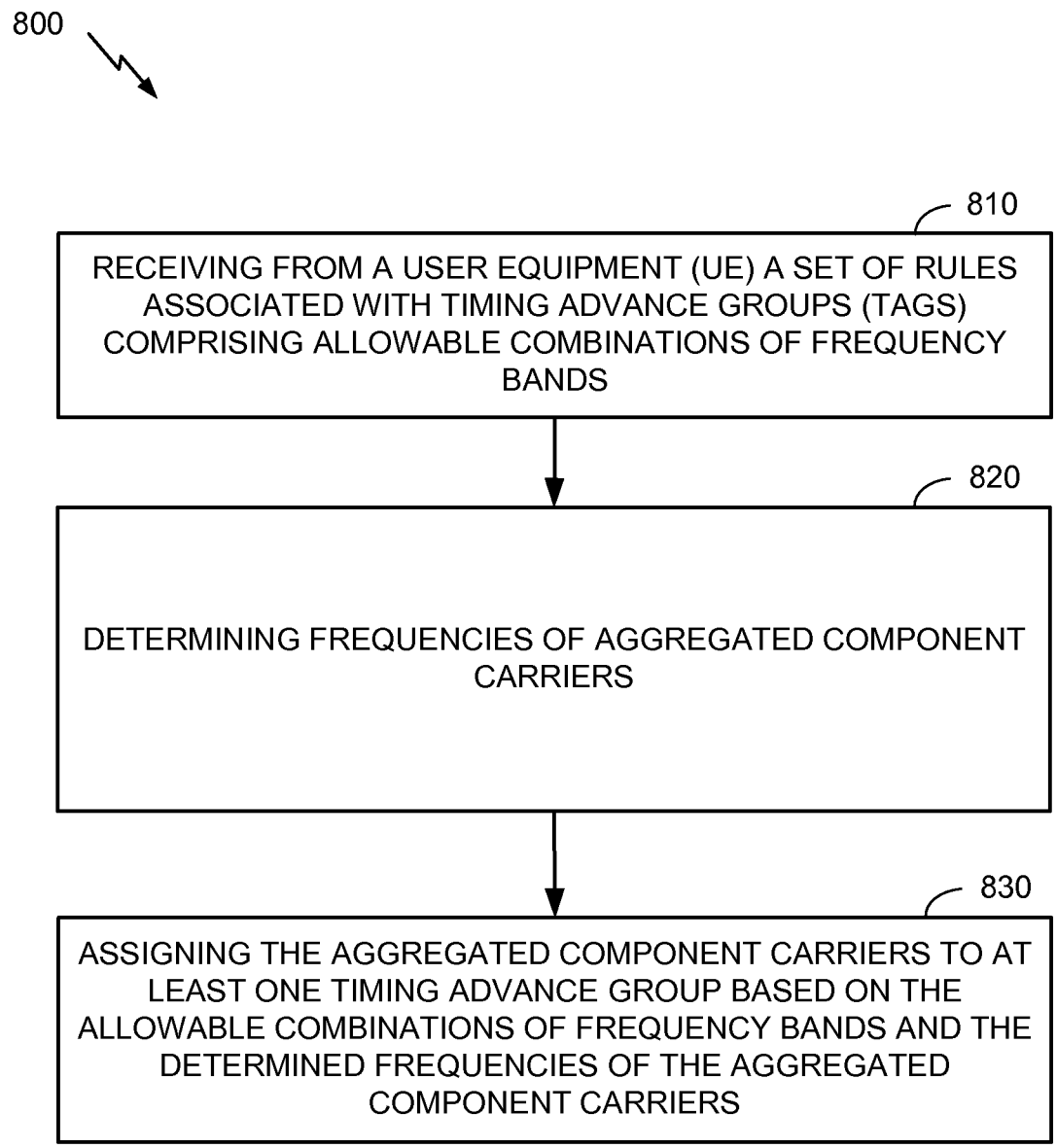
FIG. 8 illustrates aspects of a methodology performed by a base station for assigning aggregated component carriers to TAGs.

In accordance with one or more aspects of the embodiments described herein, with reference to FIG. 8, there is shown a methodology 800, operable by a network entity (e.g., a base station, a Node B, an access point, or the like). Specifically, method 800 describes assigning aggregated component carriers to timing advance groups (TAGs). The method 800 may involve, at 810, receiving from a user equipment (UE) a set of rules associated with timing advance groups (TAGs). The method 800 may involve, at 820, determining frequencies of aggregated component carriers. Further, the method may involve, at 830, assigning the aggregated component carriers to at least one timing advance group based on the received set of rules and the determined frequencies of the aggregated component carriers. The timing advance groups may be groups of aggregated component carriers.

Figure 9:
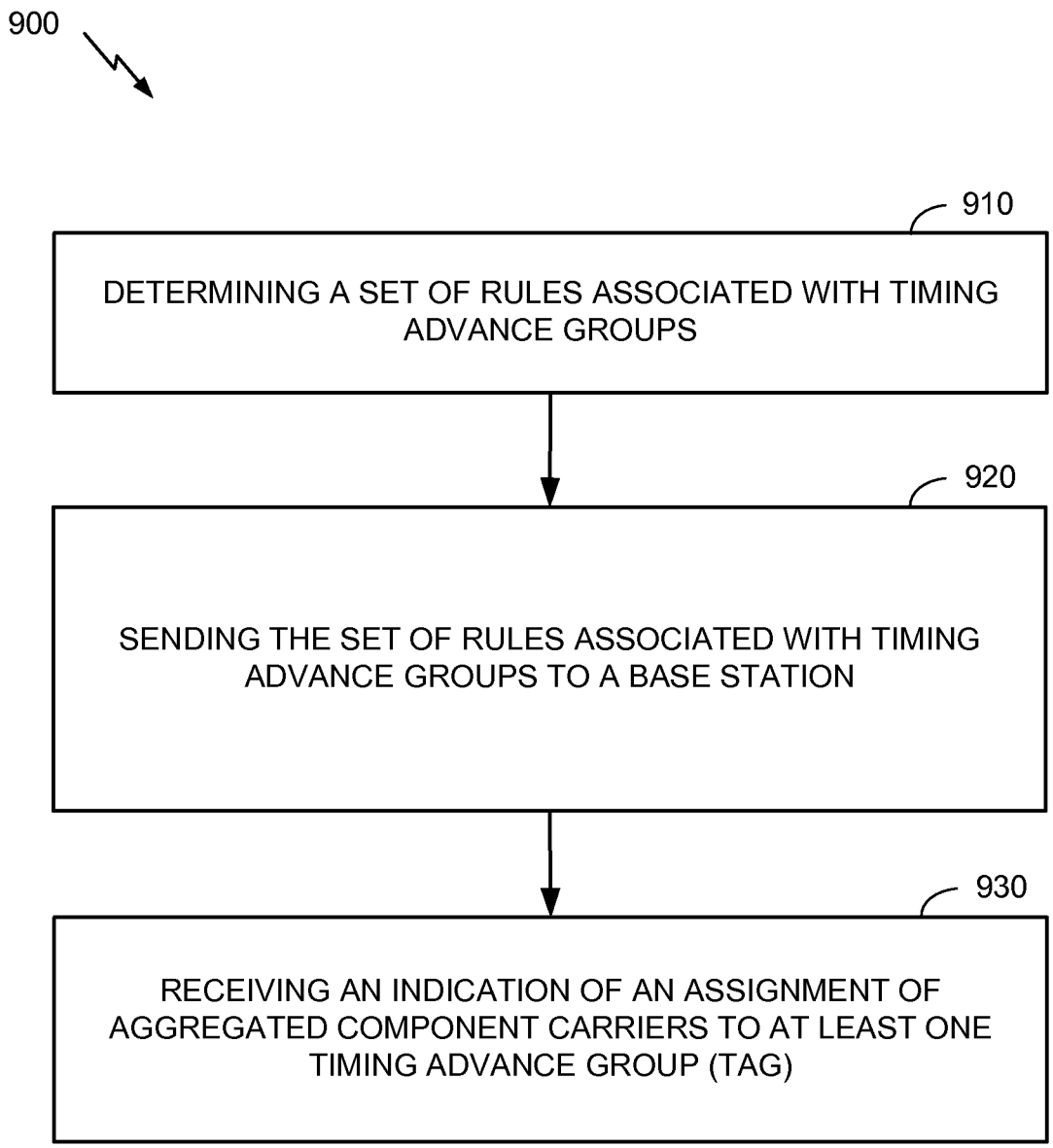
FIG. 9 illustrates aspects of a methodology performed by a UE for signaling rules for grouping aggregated component carriers to TAGs.

In accordance with one or more aspects of the embodiments described herein, with reference to FIG. 9, there is shown a methodology 900 operable by a wireless entity (e.g., a user equipment, wireless device, wireless terminal, mobile device, or the like). Specifically, method 900 describes signaling rules for grouping aggregated component carriers to timing advance groups (TAGs). The method 900 may involve, at 910, determining a set of rules associated with timing advance groups. The method 900 may involve, at 920, sending the set of rules associated with timing advance groups to a base station. The method 900 may involve, at 930, receiving an indication of an assignment of aggregated component carriers to at least one timing advance group (TAG) of aggregated component carriers. For example, the assignment to the at least one timing advance group may correspond to the set of rules.

Figure 10:
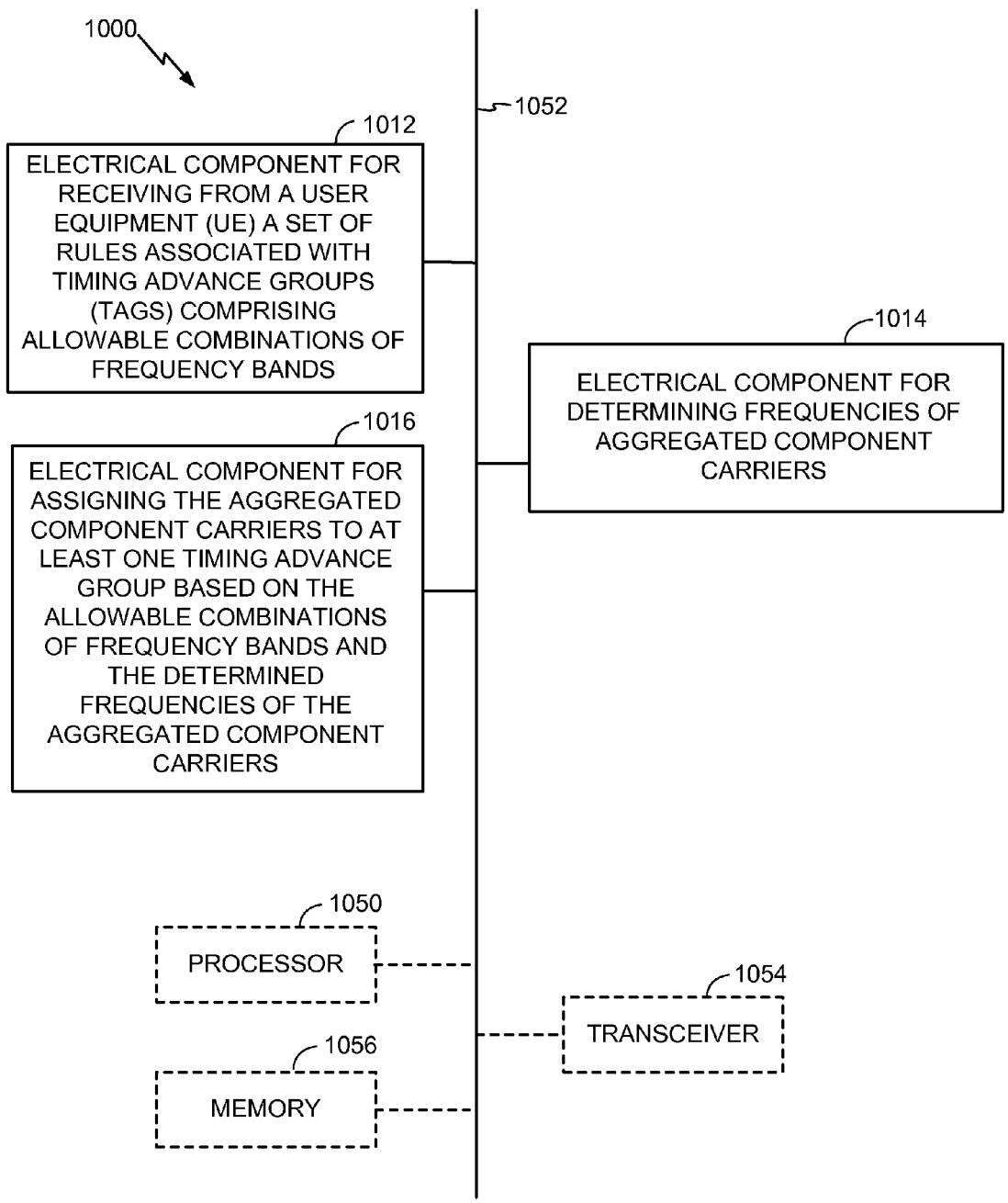
FIG. 10 shows an embodiment of an apparatus for assigning aggregated component carriers to TAGs, in accordance with the methodology of FIG. 8.

FIG. 10 shows an embodiment of apparatus for assigning aggregated component carriers to timing advance groups (TAGs), in accordance with the methodology of FIG. 8. With reference to FIG. 10, there is provided an exemplary apparatus 1000 that may be configured as a network entity (e.g., a base station, a Node B, an access point, or the like) in a wireless network, or as a processor or similar device/component for use within the network entity. For example, apparatus 1000 may be base station 110 of FIG. 3. The apparatus 1000 may include functional blocks that can represent functions implemented by a processor, software, or combination thereof (e.g., firmware). For example, apparatus 1000 may include an electrical component or module 1012 for receiving from a user equipment (UE) a set of rules associated with timing advance groups (TAGs). The apparatus 1000 may also include a component 1014 for determining frequencies of aggregated component carriers. The apparatus 1000 may also include a component 1016 for assigning the aggregated component carriers to at least one timing advance group based on the received set of rules and the determined frequencies of the aggregated component carriers. The timing advance groups may be groups of aggregated component carriers.

In related aspects, the apparatus 1000 may optionally include a processor component 1050 having at least one processor, in the case of the apparatus 1000 configured as a wireless entity (e.g., a user equipment, wireless device, wireless terminal, mobile device, or the like), rather than as a processor. The processor 1050, in such case, may be in operative communication with the components 1012-1016 via a bus 1052 or similar communication coupling. The processor 1050 may effect initiation and scheduling of the processes or functions performed by electrical components 1012-1016.

In further related aspects, the apparatus 1000 may include a radio transceiver component 1054. A stand alone receiver and/or stand alone transmitter may be used in lieu of or in conjunction with the transceiver 1054. When the apparatus 1000 is a wireless entity, the apparatus 1000 may also include a network interface (not shown) for connecting to one or more core network entities. The apparatus 1000 may optionally include a component for storing information, such as, for example, a memory device/component 1056. The computer readable medium or the memory component 1056 may be operatively coupled to the other components of the apparatus 1000 via the bus 1052 or the like. The memory component 1056 may be adapted to store computer readable instructions and data for effecting the processes and behavior of the components 1012-1016, and subcomponents thereof, or the processor 1050, or the methods disclosed herein. The memory component 1056 may retain instructions for executing functions associated with the components 1012-1016. While shown as being external to the memory 1056, it is to be understood that the components 1012-1016 can exist within the memory 1056. It is further noted that the components in FIG. 10 may comprise processors, electronic devices, hardware devices, electronic sub-components, logical circuits, memories, software codes, firmware codes, etc., or any combination thereof.

Figure 11:
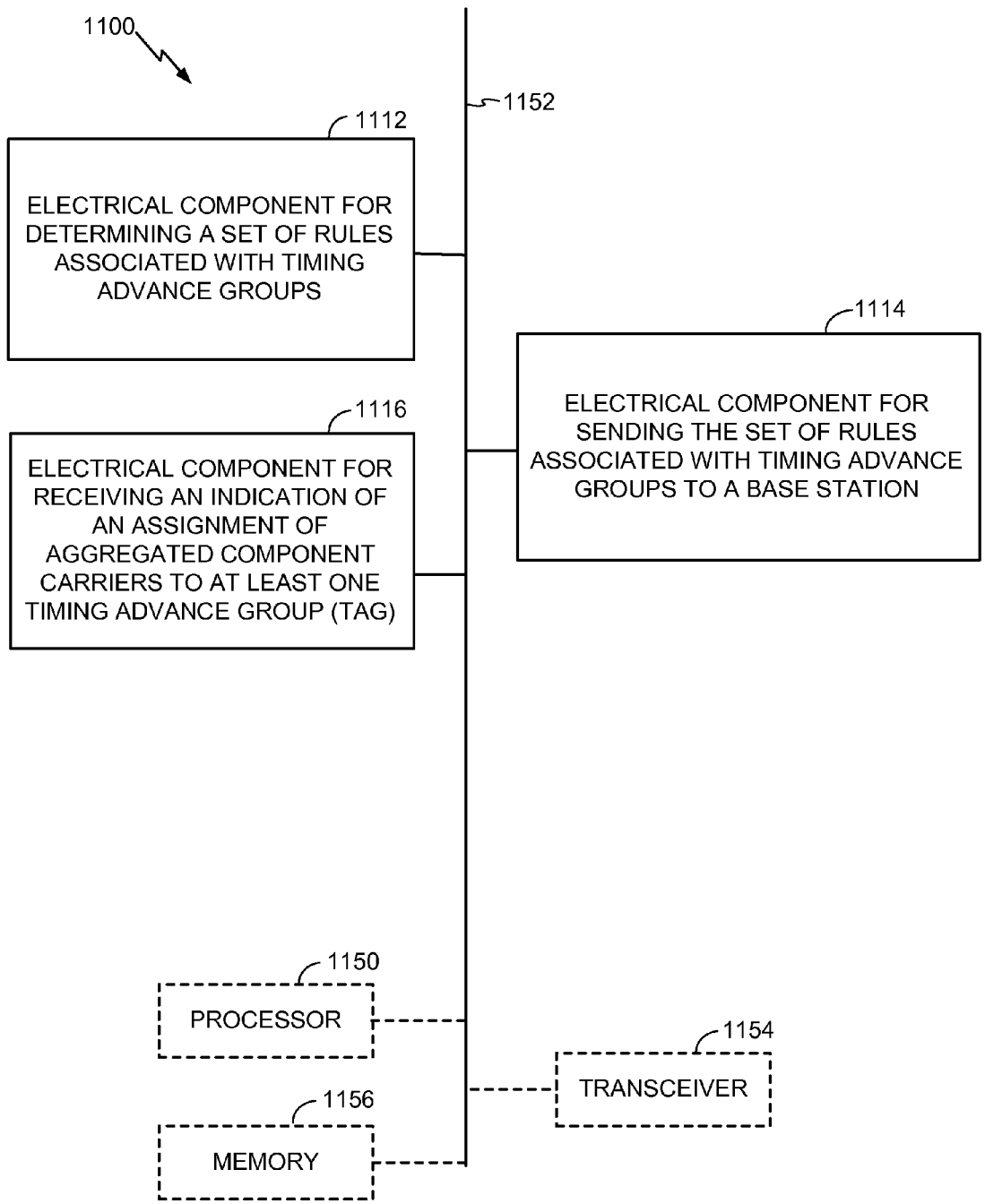
FIG. 11 shows an embodiment of an apparatus for assigning aggregated component carriers to TAGs, in accordance with the methodology of FIG. 9.

FIG. 11 shows an embodiment of apparatus for signaling rules for grouping aggregated component carriers to timing advance groups (TAGs), in accordance with the methodology of FIG. 9. With reference to FIG. 11, there is provided an exemplary apparatus 1100 that may be configured as a wireless entity (e.g., a user equipment, wireless device, wireless terminal, mobile device, or the like) in a wireless network, or as a processor or similar device/component for use within the network entity. For example, apparatus 1100 may be UE 120 of FIG. 3. The apparatus 1100 may include functional blocks that can represent functions implemented by a processor, software, or combination thereof (e.g., firmware). For example, apparatus 1100 may include an electrical component or module 1112 for determining a set of rules associated with timing advance groups. The apparatus 1100 may also include a component 1114 for sending the set of rules associated with timing advance groups to a base station. The apparatus 1100 may also include a component 1116 for receiving an indication of an assignment of aggregated component carriers to at least one timing advance group (TAG) of aggregated component carriers. For example, the assignment to the at least one timing advance group may correspond to the set of rules.

In related aspects, the apparatus 1100 may optionally include a processor component 1150 having at least one processor, in the case of the apparatus 1100 configured as a wireless entity (e.g., a user equipment, wireless device, wireless terminal, mobile device, or the like), rather than as a processor. The processor 1150, in such case, may be in operative communication with the components 1112-1116 via a bus 1152 or similar communication coupling. The processor 1150 may effect initiation and scheduling of the processes or functions performed by electrical components 1112-1116.

In further related aspects, the apparatus 1100 may include a radio transceiver component 1154. A stand alone receiver and/or stand alone transmitter may be used in lieu of or in conjunction with the transceiver 1154. When the apparatus 1100 is a wireless entity, the apparatus 1100 may also include a network interface (not shown) for connecting to one or more core network entities. The apparatus 1100 may optionally include a component for storing information, such as, for example, a memory device/component 1156. The computer readable medium or the memory component 1156 may be operatively coupled to the other components of the apparatus 1100 via the bus 1152 or the like. The memory component 1156 may be adapted to store computer readable instructions and data for effecting the processes and behavior of the components 1112-1116, and subcomponents thereof, or the processor 1150, or the methods disclosed herein. The memory component 1156 may retain instructions for executing functions associated with the components 1112-1116. While shown as being external to the memory 1156, it is to be understood that the components 1112-1116 can exist within the memory 1156. It is further noted that the components in FIG. 11 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
receiving from a user equipment (UE) a set of rules associated with timing advance groups (TAGs) comprising allowable combinations of frequency bands, the set of rules including a first rule specifying a quantity of supported TAGs for intra-band carrier aggregation and a second rule specifying a quantity of supported TAGs for inter-band carrier aggregation;
determining frequencies of aggregated component carriers; and
assigning the aggregated component carriers to at least one timing advance group based on the allowable combinations of frequency bands and the determined frequencies of the aggregated component carriers.

2. The method of claim 1, wherein the set of rules further comprises a third rule specifying allowable combinations of TAGs.

3. The method of claim 2, wherein the assigning comprises at least one of: (i) assigning aggregated component carriers with frequencies in a pre-determined frequency band to at least one TAG for intra-band carrier aggregation; (ii) assigning aggregated component carriers with frequencies in different pre-determined frequency bands to at least one TAG for inter-band carrier aggregation; (iii) assigning aggregated component carriers with allowable combinations of frequency bands to a same TAG; or (iv) refraining from assigning aggregated component carriers with non-allowable combinations of frequency bands to a same TAG.

4. The method of claim 1, wherein the at least one TAG comprises at least one TAG and at most four TAGS.

5. The method of claim 1, wherein the allowable combinations of frequency bands define an exclusion of a first subset of the frequency bands and an inclusion of a second subset of the frequency bands.

6. The method of claim 1, wherein the assigning comprising assigning to one of an existing TAG or a new TAG.

7. A wireless network entity comprising:
   means for receiving from a user equipment (UE) a set of rules associated with timing advance groups (TAGs) comprising allowable combinations of frequency bands, the set of rules including a first rule specifying a quantity of supported TAGs for intra-band carrier aggregation and a second rule specifying a quantity of supported TAGs for inter-band carrier aggregation;
   means for determining frequencies of aggregated component carriers; and
   means for assigning the aggregated component carriers to at least one timing advance group based on the allowable combinations of frequency bands and the determined frequencies of the aggregated component carriers.

8. The wireless network entity of claim 7, wherein the set of rules further comprises a third rule specifying allowable combinations of TAGs, or a fourth rule specifying allowable combinations of frequency bands.

9. The wireless network entity of claim 8, wherein the means for assigning is further configured for at least one of: (i) assigning aggregated component carriers with frequencies in a pre-determined frequency band to at least one TAG for intra-band carrier aggregation; (ii) assigning aggregated component carriers with frequencies in different pre-determined frequency bands to at least one TAG for inter-band carrier aggregation; (iii) assigning aggregated component carriers with allowable combinations of frequency bands to a same TAG; or (iv) refraining from assigning aggregated component carriers with non-allowable combinations of frequency bands to a same TAG.

10. A wireless network entity comprising:
    at least one processor configured to:
      receive from a user equipment (UE) a set of rules associated with timing advance groups (TAGs) comprising allowable combinations of frequency bands, the set of rules including a first rule specifying a quantity of supported TAGs for intra-band carrier aggregation and a second rule specifying a quantity of supported TAGs for inter-band carrier aggregation,
      determine frequencies of aggregated component carriers, and
      assign the aggregated component carriers to at least one timing advance group of aggregated component carriers based on the allowable combinations of frequency bands and the determined frequencies of the aggregated component carriers; and
    a memory coupled to the at least one processor for storing data.

11. The wireless network entity of claim 10, wherein the set of rules further comprises a third rule specifying allowable combinations of TAGs, or a third rule specifying allowable combinations of frequency bands.

12. The wireless network entity of claim 11, wherein to assign the aggregated component carriers further comprises at least one of: (i) to assign aggregated component carriers with frequencies in a pre-determined frequency band to at least one TAG for intra-band carrier aggregation; (ii) to assign aggregated component carriers with frequencies in different pre-determined frequency bands to at least one TAG for inter-band carrier aggregation; (iii) to assign aggregated component carriers with allowable combinations of frequency bands to a same TAG; or (iv) to refrain from assigning aggregated component carriers with non-allowable combinations of frequency bands to a same TAG.

13. A computer program product, comprising:
    a non-transitory computer-readable medium comprising code for causing at least one computer to:
      receive from a user equipment (UE) a set of rules associated with timing advance groups (TAGs) comprising allowable combination of frequency bands, the set of rules including a first rule specifying a quantity of supported TAGs for intra-band carrier aggregation and a second rule specifying a quantity of supported TAGs for inter-band carrier aggregation;
      determine frequencies of aggregated component carriers; and
      assign the aggregated component carriers to at least one timing advance group of aggregated component carriers based on the received set of rules and the determined frequencies of the aggregated component carriers.

14. The computer program product of claim 13, wherein the set of rules further comprises a third rule specifying allowable combinations of TAGs, or a fourth rule specifying allowable combinations of frequency bands.

15. The computer program product of claim 14, wherein the code for causing the at least one computer to assign the aggregated component carriers is further configured to at least one of: (i) assign aggregated component carriers with frequencies in a pre-determined frequency band to at least one TAG for intra-band carrier aggregation; (ii) assign aggregated component carriers with frequencies in different pre-determined frequency bands to at least one TAG for inter-band carrier aggregation; (iii) assign aggregated component carriers with allowable combinations of frequency bands to a same TAG; or (iv) refrain from assigning aggregated component carriers with non-allowable combinations of frequency bands to a same TAG.

16. A method comprising:
    determining a set of rules associated with timing advance groups (TAGSTAGs), the set of rules including a first rule specifying a quantity of supported TAGs for intra-band carrier aggregation and a second rule specifying a quantity of supported TAGs for inter-band carrier aggregation;
    sending the set of rules associated with TAGs to a base station; and
    receiving an indication of an assignment of aggregated component carriers to at least one timing advance group, wherein the assignment to the at least one timing advance group corresponds to the set of rules.

17. The method of claim 16, wherein the set of rules further comprises a third rule specifying allowable combinations of TAGs, or a fourth rule specifying allowable combinations of frequency bands.

18. A user equipment comprising:
    means for determining a set of rules associated with timing advance groups (TAGs), the set of rules including a first rule specifying a quantity of supported TAGs for intra-band carrier aggregation and a second rule specifying a quantity of supported TAGs for inter-band carrier aggregation;

means for sending the set of rules associated with TAGs to a base station; and means for receiving an indication of an assignment of aggregated component carriers to at least one timing advance group, wherein the assignment to the at least one timing advance group corresponds to the set of rules.

19. The user equipment of claim 18, wherein the set of rules further comprises a third rule specifying allowable combinations of TAGs, or a fourth rule specifying allowable combinations of frequency bands.

20. A user equipment comprising:
at least one processor configured to:
    determine a set of rules associated with timing advance groups (TAGs), the set of rules including a first rule specifying a quantity of supported TAGs for intra-band carrier aggregation and a second rule specifying a quantity of supported TAGs for inter-band carrier aggregation,
    send the set of rules associated with TAGs to a base station, and
    receive an indication of an assignment of aggregated component carriers to at least one timing advance group, wherein the assignment to the at least one timing advance group corresponds to the set of rules; and a memory coupled to the at least one processor for storing data.

21. The user equipment of claim 20, wherein the set of rules further comprises a third rule specifying allowable combinations of TAGs, or a fourth rule specifying allowable combinations of frequency bands.

22. A computer program product, comprising:
a non-transitory computer-readable medium comprising code for causing at least one computer to:
    determine a set of rules associated with timing advance groups (TAGs), the set of rules including a first rule specifying a quantity of supported TAGs for intra-band carrier aggregation and a second rule specifying a quantity of supported TAGs for inter-band carrier aggregation;
    send the set of rules associated with TAGs to a base station; and
    receive indication of an assignment of aggregated component carriers to at least one timing advance group, wherein the assignment to the at least one timing advance group corresponds to the set of rules.

23. The computer program product of claim 22, wherein the set of rules further comprises at a third rule specifying allowable combinations of TAGs, or allowable combinations of frequency bands.

* * * * *